United States Patent [19]

McEachern

[11] Patent Number: 5,530,738

[45] Date of Patent: Jun. 25, 1996

[54] ELECTRIC POWER MEASURING INSTRUMENT WITH SPEECH SYNTHESIS FEATURE

[75] Inventor: Alexander McEachern, Oakland, Calif.

[73] Assignee: Infrastructure Instruments Inc., Oakland, Calif.

[21] Appl. No.: 342,901

[22] Filed: Nov. 21, 1994

[51] Int. Cl.⁶ .................................................. H04M 11/00
[52] U.S. Cl. ............................................... 379/88; 379/100
[58] Field of Search ...................................... 379/106, 107, 379/100, 201, 207, 102, 104, 105, 97, 98, 92, 93; 340/870.02

[56] References Cited

U.S. PATENT DOCUMENTS

| | | | |
|---|---|---|---|
| 3,813,667 | 5/1974 | Smith | 340/248 |
| 4,455,453 | 6/1984 | Parasekvakos | 379/106 |
| 4,642,563 | 2/1987 | McEachern et al. | 324/111 |
| 4,694,402 | 9/1987 | McEachern et al. | 364/487 |
| 4,741,023 | 4/1988 | Lawson | 379/106 |
| 4,758,962 | 7/1988 | Fernandes | 364/483 |
| 4,799,005 | 1/1989 | Fernandes | 324/127 |
| 4,818,947 | 4/1989 | Zucker et al. | 324/57 |
| 4,866,754 | 9/1989 | Hashimoto | 379/68 |
| 4,996,703 | 2/1991 | Gray | 379/106 |
| 5,216,228 | 6/1993 | Hashimoto | 235/375 |
| 5,216,621 | 6/1993 | Dickens | 364/483 |
| 5,233,538 | 8/1993 | Wallis | 364/483 |
| 5,237,507 | 8/1993 | Chasek | 364/464.04 |
| 5,270,637 | 12/1993 | McEachern et al. | 324/102 |
| 5,298,854 | 3/1994 | McEachern et al. | 324/142 |
| 5,298,885 | 3/1994 | McEachern et al. | 340/660 |
| 5,307,009 | 4/1994 | McEachern et al. | 324/142 |
| 5,408,523 | 4/1995 | McEachern | 379/107 |

Primary Examiner—Jeffery Hofsass
Assistant Examiner—Thomas F. Presson

[57] ABSTRACT

An electronic measuring instrument measures and records power disturbances and other power parameters on an alternating current system. The instrument incorporates a speech synthesis subsystem, coupled to a telephone system, which is capable of providing a spoken report describing power disturbances and other power parameters. The telephone coupling system incorporates a structure for sharing a telephone extension in a non-disruptive way.

9 Claims, 4 Drawing Sheets

ELECTRIC POWER MEASURING INSTRUMENT WITH SPEECH SYNTHESIS FEATURE

CROSS REFERENCE TO RELATED APPLICATIONS

None.

FIELD OF INVENTION

This invention relates to electronic measuring and recording instruments, more specifically to electronic instruments for measuring and recording electric power parameters at a first location, such measurements subsequently being transmitted to a second location through a telephone system or the like.

BACKGROUND OF THE INVENTION

Instruments for measuring and recording electric power parameters, such as power flow and power disturbance parameters, are well known in the art. Such instruments typically connect to electric power voltage and current signals, then either compare those signals to thresholds that have been programmed for various types of well-known power disturbance events, such as harmonics, voltage swells and sags, imbalance, power failures, waveshape faults, impulses, frequency variations, flicker, and high frequency noise, or mathematically process those signals to extract power flow parameters. When a triggering event occurs, such as a power disturbance event or an..elapsed interval of time, these well-known instruments generate an alarm or report. The alarm or report may consist of a indicator on the instrument itself, or a printed or displayed report at the instrument.

For at least twenty years, attempts have been made to make the reports of such power parameter recording instruments sufficiently easy to interpret that no special training in their interpretation would be required, and attempts have been made to make those reports available at convenient locations, which are typically located at some distance from electric power system being measured.

Despite all these efforts, a power recording instrument that requires essentially no user training has remained elusive.

Early power disturbance instruments, such as that disclosed by Smith in 1974 in U.S. Pat. No. 3,813,667, presented reports that consisted of electro-mechanical counters, and provided a remote alarm external voltage that could, for example, ring an alarm bell at a remote location. Skilled interpretation of the meaning of numbers shown on the electro-mechanical counters was required.

Subsequent power disturbance monitors, such as the Model 606 manufactured by Dranetz Technologies of Edison, N.J., beginning in the mid-1970's, made-interpretation of reports somewhat easier by providing a printed tape that showed the time, date, amplitude, and type of disturbance. Skilled interpretation was still required; special training courses were offered on interpreting these printed tapes.

In the early 1980's, power disturbance monitors with simple latched alarm indicators, such as the Model GS-1 manufactured by Basic Measuring Instruments of Santa Clara, Calif., became available. Although less skill was required to interpret these indicators than the printed tapes of other power disturbance monitors, less information was available as well; the user could not tell when a disturbance occurred, or how many occurred. The information was available only at the site where the instrument was installed; no remote communication was possible.

In the middle 1980's, power disturbance monitors were developed that provided a graphic representation of power disturbances, such as those disclosed by McEachern et al. in U.S. Pat. Nos. 4,642,563 and 4,694,402. These graphic monitors were intuitively easier to interpret than printed text, at least for technically skilled users. But special interpretation training was still required. As of the date of this application, graphic power disturbance monitors represent the state of the art. Considerable training and expertise is required to interpret the reports of such graphic power disturbance monitors. Indeed, several organizations offer well-attended classes taught by experts in interpreting the results of such graphic power disturbance monitors.

In addition to local notification, the alarm or report generated by such instruments may also be transmitted by telephone. It is well-known in the art to construct power parameter monitoring instruments that couple to a telephone line, and that dial a pre-programmed number whenever a power disturbance event occurs. Such instruments are widely available from Basic Measuring Instruments of Santa Clara, Calif.; Dranetz Technologies of Edison, N.J.; and many other suppliers. All such instruments are designed to communicate through the standard telephone system with a computer or computer-based system. Such instruments are usually also capable of answering an incoming call; again, all such instruments expect the incoming call to be originated by a computer or a computer-based system.

It is often difficult to obtain a telephone line for such an instrument. Typically, these systems make and receive only a few calls per month, and it may be difficult to economically justify installing a telephone line for so few calls.

Due to the requirements described above for expertise in interpreting the reports from power disturbance monitors, it is typical industry practice for such instruments to be controlled and used by technically skilled individuals, such as power quality engineers and utility field technicians. These individuals typically have access to, and are comfortable with, the computer-based systems required to communicate with such instruments. But, as competition between electric utilities increases, it is frequently a marketing executive or another user with minimal technical training, not a power quality engineer, who needs immediate information about power quality events at a utility customer. Such an individual is often more comfortable with pagers and voice-mail systems than he or she is with computer-based programming.

Attempts to make the prior-art computer-based systems sufficiently friendly for wide-spread use by utility marketing executives, for example, have not achieved commercial success.

Speech-synthesis systems, which allow microcomputer-based devices to generate synthetic human speech signals, are well known in the art. Such systems frequently form the basis for interacting with voice-mail systems, for example.

Despite the wide-spread use of power disturbance measuring instruments, and despite the wide-spread connection of such instruments to telephone systems, the prior art does not teach employment of speech synthesis for remote communication with such instruments.

This invention provides a novel combination of well-known power parameter measuring and recording technology with well-known speech synthesis technology. It further combines a novel technology for sharing a phone line with other users.

This invention succeeds in making a sufficiently easy-to-use system for wide-spread use by minimally trained users where other approaches have failed.

The combination provides an unexpected result in that consumers of electric power, who typically have even less knowledge than utility executives about electric power, find the invention sufficiently easy to use that they can check on recorded power parameters themselves. For example, a typical consumer who has access to this invention can check whether a suspected power quality disturbance event did in fact take place without even contacting his or her utility supplier.

Objects and Advantages

It is an object of this invention to provide a power parameter recording instrument that provides reports that can be interpreted without requiring significant training or expertise.

It is a further object of this invention to provide a power parameter recording instrument that is controlled by its user through a standard telephone without requiring additional equipment, such as a computer.

It is a further object of this invention to provide an instrument that makes available up-to-the-minute power consumption data to its user through a standard telephone without requiring additional equipment, such as a specialized reader or a computer.

It is a further object of this invention to share a telephone line with other users of that telephone line in a way that minimizes disruptions to those other users.

Still further objects and advantages will become apparent from a consideration of the ensuing description and accompanying drawings.

Preferred Embodiment—Description

Figure 1:
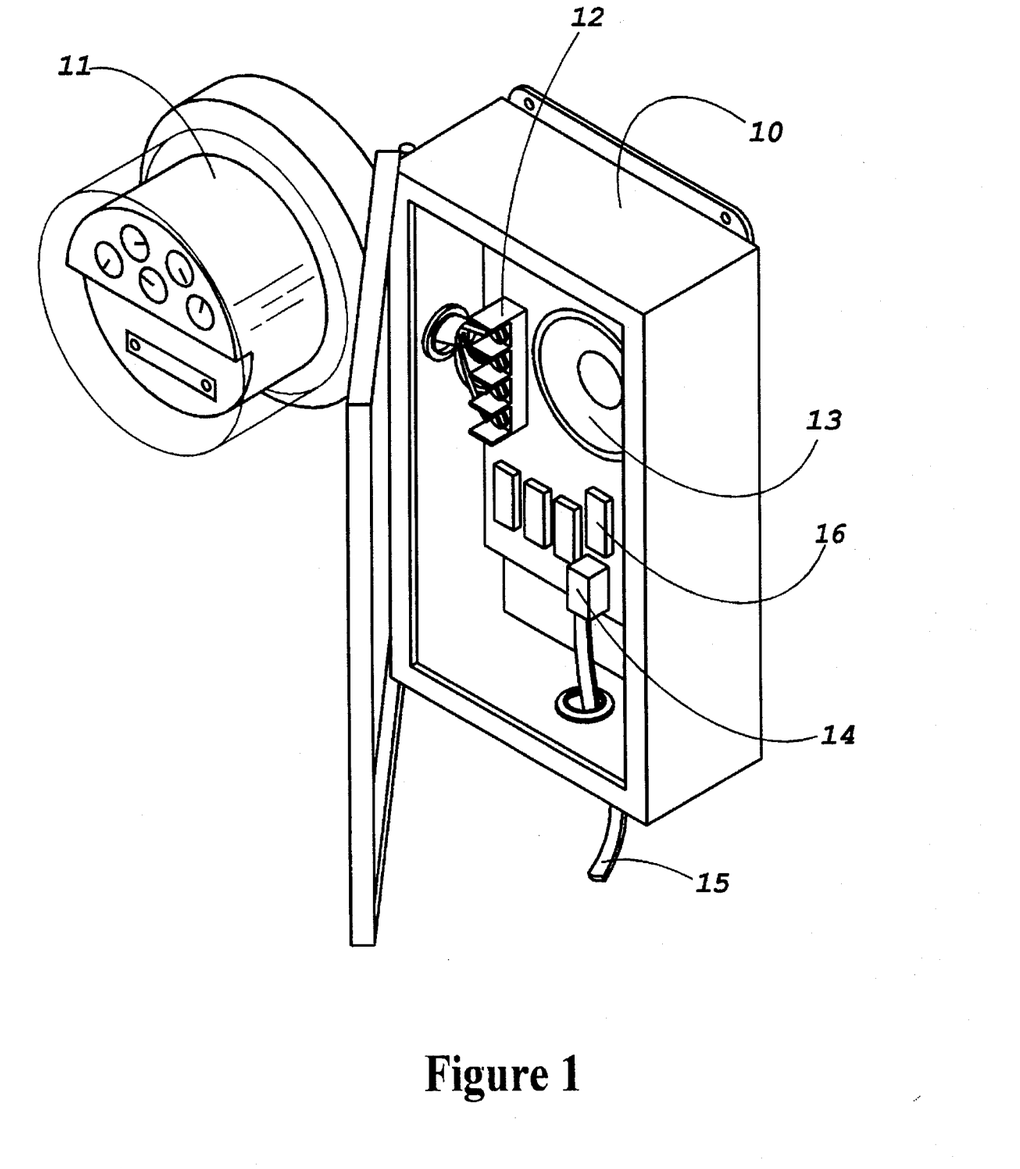
FIG. 1 is a perspective view of the present invention.

Turning first to FIG. 1, we see a perspective view of the instrument 10 of the present invention. An electric utility revenue meter 11 is shown to provide context and scale for the present invention. Voltages, currents, and other signals from the revenue meter 11 are brought to a set of screw terminals 12. Various circuits on printed circuit board 16, described more fully in FIG. 2 and FIG. 3, examine and process the signals at the screw terminals 12. These signals may be examined for various power disturbances well known in the art such as harmonics, voltage swells and sags, imbalance, power failures, waveshape faults, impulses, frequency variations, flicker, and high frequency noise. Other signals from the revenue meter 11 may indicate power consumption and elapsed demand interval. If any of these disturbances or signals exceed programmed thresholds, or if a pre-programmed time interval has elapsed, or if another triggering event occurs, the instrument 10 can synthesize a spoken report about these signals. The spoken report may be heard on a speaker 13, and may be transmitted through a connector 14 to the telephone system 15.

Figure 2:
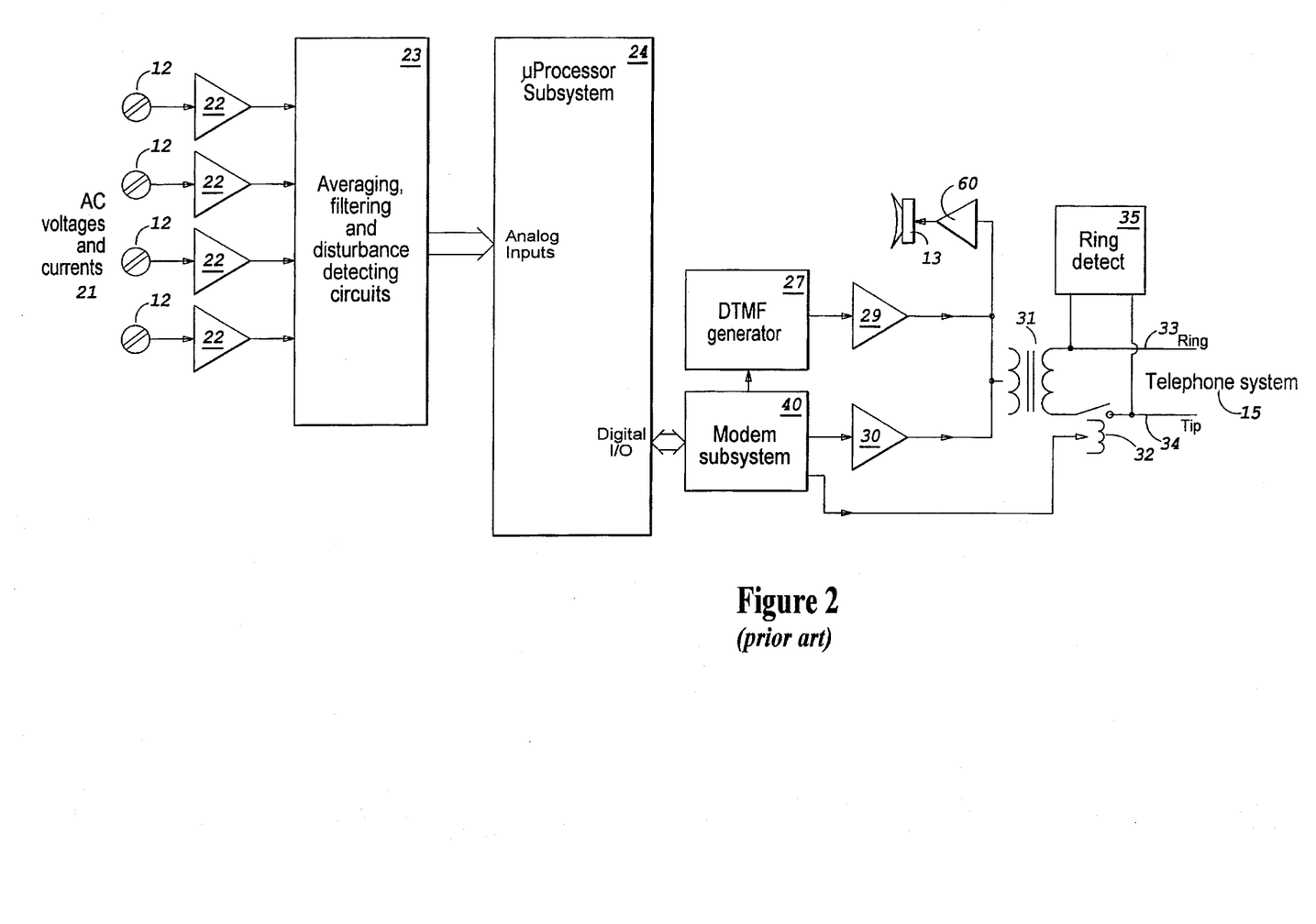
FIG. 2 shows a block diagram of the prior art.

Turning now to FIG. 2, we see a block diagram of the prior art related to the present invention. Beginning at the far left, we see alternating current (AC) voltages and currents 21 from the electric power system coupled to screw terminals 12, which can also be seen in FIG. 1. These signals are applied to scaling and amplifying means 22, well known in the art, the outputs of which are electronic signals proportional to the AC voltages and currents 21 coupled to screw terminals 12. Such scaling and amplifying means 22 may, for example, in the case of voltage signals consist of resistor/capacitive voltage dividers coupled to differential amplifiers, and in the case of current signals may consist of burden resistors coupled to differential amplifiers.

Continuing to examine the prior art of FIG. 2, we see that these signals are coupled to a set of averaging, filtering, and disturbance detecting circuits 23. These circuits 23 comprise any power disturbance and measuring circuit that is well known in the art, and may consist, for example, of low-pass anti-alias filters, true root-mean-square converters, analog multipliers, time-division-multiplexing multipliers, high-pass filters, peak detectors, noise rectifiers, and the like. The outputs of these averaging, filtering, and disturbance detecting circuits 23 are applied to analog inputs of a microprocessor subsystem 24. The microprocessor subsystem 24 may incorporate features well known in the art and omitted from the figures because they are not relevant to the present invention, such as memory, power supplies, back-up batteries, re-charging circuits, clock/calendar, displays, control switches, and the like. The microprocessor subsystem 24 inspects its analog inputs, performs any necessary calculations, and, if the result of its inspections and calculations meet certain programmed criteria well known in the art, generates a report. This report may be displayed locally. It may also be transmitted to a remote receiver through a modem subsystem 40.

Continuing to examine the prior art of FIG. 2, we see at the far right side the well known tip 34 conductor and ring 33 conductor of the telephone system 15, which can also be seen in FIG. 1. As is well known in the art, the tip 34 conductor and ring 33 conductor are commonly referred to together as a telephone conductor pair, or simply a conductor pair. A ring detect circuit 35, of any form well known in the art, is coupled to the conductor pair 33, 34; the isolated output of the ring detect circuit 35, not shown on the drawing, is coupled to the modem subsystem 40 through any means well known in the art, such as optically isolated coupling. The ring detect circuit 35 tells the modem subsystem that a ringing signal is in progress on the tip 34 conductor and ring 33 conductor. We also see a single-pole relay 32 that connects the tip 34 conductor to an isolation transformer 31, which may have the 600 ohm impedance well know in the art. As is well known in the art, at those times when the relay 32 contacts are open, the telephone connection is referred to as "on-hook", and at those times when the relay 32 contacts are closed, the telephone connection is referred to as "off-hook". Continuing to examine the prior art of FIG. 2, we see that the modem subsystem 40 can control the relay 32 to place the telephone connection in the on-hook or off-hook states. The signal output of the modem subsystem 40, which ordinarily contains encoded binary data, is coupled to an amplifier/driver 30, which in turn couples to the transformer 31. The modem subsystem 40 also controls a dual tone multifrequency (DTMF) generator 27, which in turn is coupled to a second amplifier/driver 29, through which the modem 40 can dial numbers on the telephone system 15. An amplifier 60 amplifies all of the audio signals at the transformer 31, and passes them to a speaker 13 which can also be seen in FIG. 1.

It will be recognized by one familiar with the art that the modem subsystem 40, DTMF generator 27, speaker 13, transformer 31, relay 32, and ring detect circuit 35 simply form a complete conventional modem that is well known in the art, and that allows convenient, bi-directional communication of data between computer systems over the standard telephone network.

Figure 3:
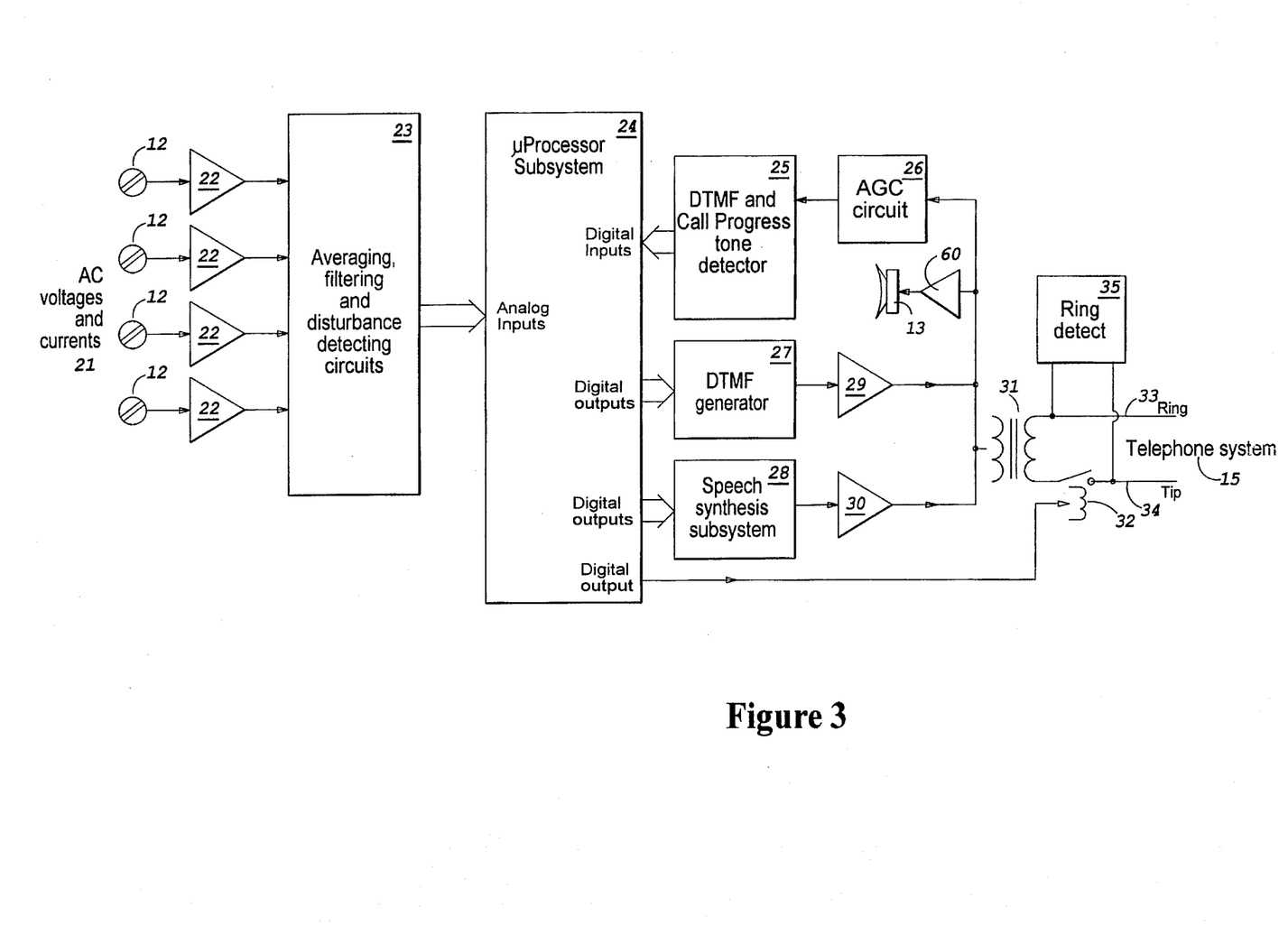
FIG. 3 shows a block diagram of the present invention, drawn in such a way as to conveniently contrast with prior art shown in FIG. 2.

Turning now to FIG. 3, we see a block diagram of a simple form of the preferred embodiment of the invention, drawn in such a way as to contrast conveniently with the prior art of FIG. 2. It will be noted that the block diagram of FIG. 3 is essentially identical to the prior art of FIG. 2, with certain changes: the modem subsystem 40 of FIG. 2 has been replaced by a speech synthesis subsystem 28 in FIG. 3, and an automatic gain control (AGC) circuit 26 has been added in FIG. 3, and a DTMF and Call Progress tone detector 25 has been added. Also, certain additional digital input and output connections to the microprocessor subsystem 24 have been changed, and the isolated output of the ring detect circuit 35 which again is not shown explicitly in FIG. 3, is coupled to the microprocessor subsystem 24 of FIG. 3 rather than to the modem subsystem 40 of FIG. 2. This last change allows the microprocessor subsystem 24 of FIG. 3 to directly detect and respond when the telephone system 15 applies a ringing signal to the tip 34 and ring 33 conductors; one such response might be to place the telephone connection in the off-hook state. Inspecting FIG. 3, we see that the microprocessor subsystem 24 now has direct control over the on-hook and off-hook states of the relay 32.

Continuing to inspect FIG. 3, we find an automatic gain control (AGC) circuit 26 which, as is well known in the art, adjusts its own gain in such a way as to produce a desired level of output signal regardless of the level of its input signal. The AGC output signal, in turn, is coupled to a dual tone multifrequency (DTMF) and Call Progress tone detector 25 which can detect both DTMF tones generated by a caller pressing dialing keys on a calling telephone and call progress tones generated by the telephone system 15 such as dial tone, busy tone, ringback tone, congestion tone, and other call progress tones familiar in the art. We see that the digital outputs of the DTMF and Call Progress tone detector 25 are coupled to the microprocessor subsystem 24, allowing it to make decisions based on actions taken by a caller who is pressing keys on a calling telephone, and allowing it to make decisions based on successive call progress tones. We also see that the microprocessor subsystem 24 has direct control over a DTMF generator 27, allowing the microprocessor subsystem to dial calls on the telephone system 15.

Most importantly in FIG. 3, we see that the microprocessor subsystem 24 has control over a speech synthesis subsystem 28, which may be any well-know speech synthesis subsystem capable of generating a useful range of vocabulary for describing power parameters or disturbances on the AC voltages and currents 21, such as the model MSM6375 Voice Synthesis Chip available from OKI Semiconductor of Sunnyvale, Calif. The output of the speech synthesis subsystem is coupled through an amplifier/driver 30 to the transformer 31, and is thus capable of driving synthesized speech into the telephone system 15.

Figure 4:
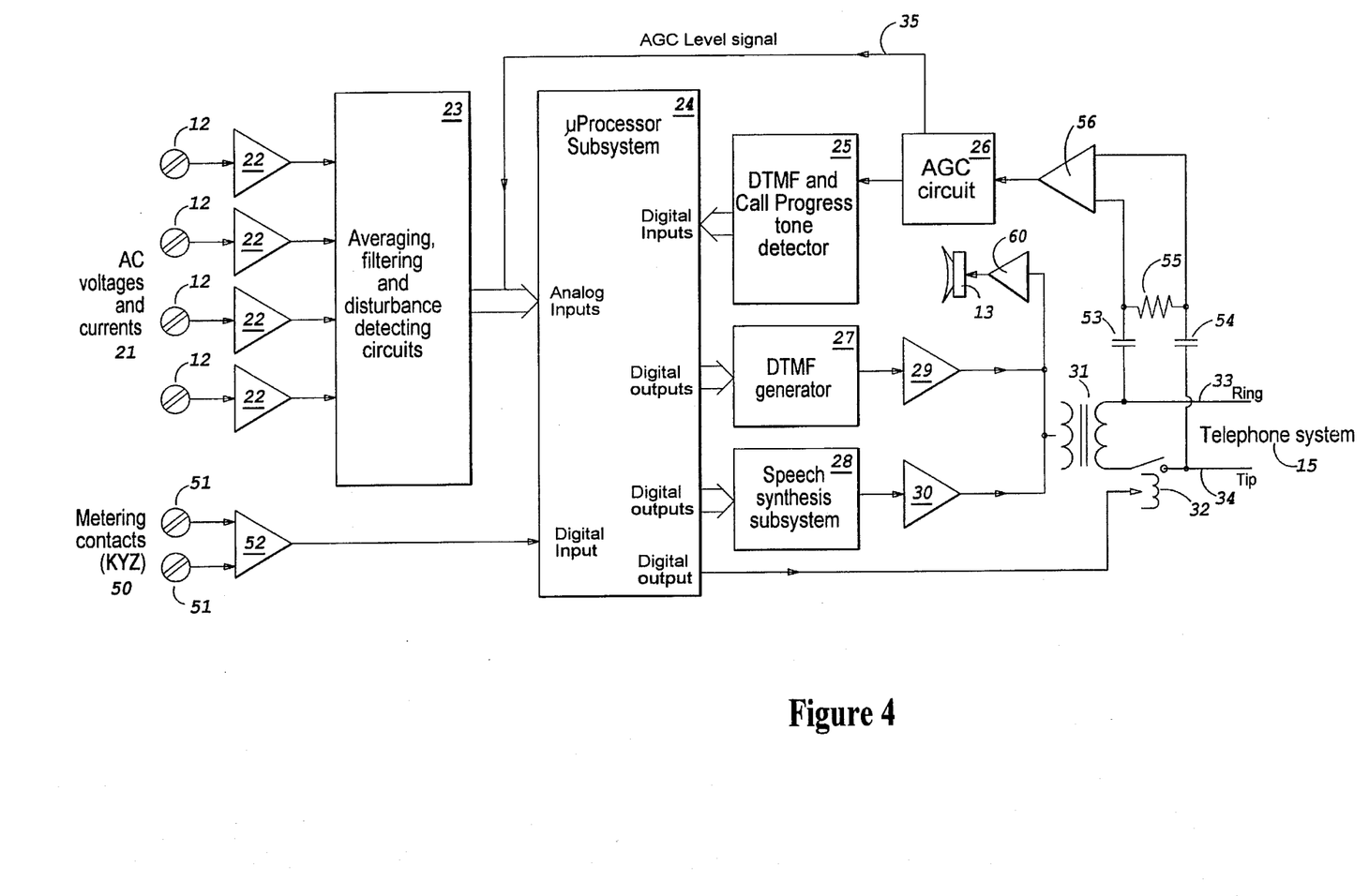
FIG. 4 shows a block diagram of the present invention, incorporating additional features not shown in FIG. 3.

Turning now to FIG. 4, we see an embodiment of the present invention that is slightly more complex than that shown in FIG. 3. The ring detect circuit 35 of FIG. 3 has been replaced in FIG. 4 by capacitors 53, 54, a resistor 55, and a differential amplifier 56, and the output of this amplifier 56 has become the input to the AGC circuit 26. An AGC Level signal 135 is made available to the analog inputs of the microprocessor subsystem 24. And a set of screw terminals 51, with associated level shifter 52, has been added to accommodate metering contacts (KYZ) 50.

We first examine the metering contacts (KYZ) 50 at the far left of FIG. 4. As is well known to one familiar with electric power revenue meter art, many electric power revenue meters are equipped with externally-accessible contacts that close and open to indicate such events as the flow of a fixed number of kilowatt-hours, or the passage of a demand interval, or occurrence of other such power-related events. These contacts are referred to in the art as KYZ contacts. A cable, not shown in the figure, attaches these metering contacts (KYZ) 50 to screw terminals 51; a level shifter 52 filters and shifts the contact closing and opening to produce a digital signal acceptable to the microprocessor subsystem 24. The microprocessor subsystem 24 consequently has the ability to accumulate readings from an associated revenue meter, such as the revenue meter 11 shown in FIG. 1.

Turning now to the right-hand side of FIG. 4, we see a coupling network formed by two capacitors 53, 54 and a resistor 55. The coupling network gives amplifier 56 access to signals on the telephone system 15 upstream of the on-hook/off-hook relay 32. Consequently, even when the relay 32 is in its on-hook state, the microprocessor subsystem 24 can detect DTMF tones that might occur, for example, during the course of a call made by or to another telephone extension that shares the conductor pair 33, 34 as the system shown in FIG. 4. The values of capacitors 53, 54 must be low enough that, to the telephone system 15, the impedance between tip 34 and ring 33 is within the on-hook levels allowed by telephone standards when the relay 32 is in its on-hook state. The voltage rating on the capacitors must be sufficient to withstand both the ringing voltage supplied by the telephone system and the possible difference in ground potential between the telephone system 15 and the AC voltages and currents 21 of the power system. A value of 100 picofarads or less with a voltage rating of 600 volts or more for these capacitors 53, 54 is adequate for most systems.

The output of the amplifier 56 contains the signal available on the telephone system 15 regardless of whether the relay 32 is in its on-hook or off-hook positions. This feature is useful in two different ways. First, the DTMF and Call Progress tone detector 25 can keep the microprocessor subsystem 24 informed of any DTMF tones on the telephone system 15, regardless of the on-hook state of the relay 32. Second, the microprocessor can extract useful information from the AGC Level signal 135. As is well known to one familiar with the art of AGC circuits, the AGC Level signal [135] is a voltage that is proportional to the average signal level at the input of the AGC circuit 26. When the AGC Level signal [135] is very high, there are high level signals present on the telephone system 15, typically caused by a ringing signal from the telephone system 15. When the AGC Level signal is moderate and fluctuating, there is a conversation in progress on the telephone conductor pair 33, 34. When the AGC Level signal is low and steady, the telephone conductor pair 33, 34 is idle (or there is silence in an on-going conversation). By selecting appropriate thresholds, the microprocessor subsystem 24 can determine whether or not the telephone conductor pair 33, 34 is in use, even prior to going to its off-hook state.

Preferred Embodiment—Operation

In operation, the invention in the embodiment shown in FIG. 3 is programmed to answer the phone line (i.e. go to its off-hook state) after some threshold number of rings are detected by the ring detect circuit 35. The threshold number of rings is selected at a sufficiently high number that other users of the same phone line have an opportunity to answer first. Once the invention has answered the phone, the caller may control the microprocessor subsystem 24 by pressing DTMF keys on the calling telephone, and the microprocessor subsystem 24 may employ the speech synthesis subsystem 28 to guide the caller through a menu of programming choices and controls, as is well known in the art of voice-mail systems. Using this approach, the caller may request an immediate report of the present or recent state of measurements, disturbances, and the like; or the caller may set disturbance thresholds, phone numbers, and other internal parameters in the microprocessor subsystem 24 that are well known in the art of power parameter recorders.

Continuing to examine the operation of the embodiment shown in FIG. 3, we see that the invention is also capable of triggering the dialing a pre-programmed phone number (or a series of such numbers) whenever a measurement or accumulation exceeds a programmed threshold, or whenever an interval of time has elapsed, such triggering being well known in the art of power disturbance monitors and power accumulators. In this case, the microprocessor subsystem 24 instructs the relay 32 to go to its off-hook state, then inspects the DTMF and call progress tone detector 25 for a dial tone. If no dial tone is detected, the microprocessor subsystem 24 concludes that the phone line is already in use, returns to its on-hook state, and tries again after some programmed interval of time. On the other hand, if a dial tone is detected, the microprocessor subsystem 24 dials the programmed number using its DTMF generator 27, waits for an appropriate set of signals from the DTMF and call progress tone detector 25 that indicates that the called telephone is ready for a report, then synthesizes a spoken report about the triggering event.

The embodiment of FIG. 3, although practical and useful, has the three disadvantages, all of which are addressed in the embodiment shown in FIG. 4: first, a caller cannot gain access to the invention if any other extension sharing the same phone line answers the telephone first; second, a user of another extension hears annoying clicking noises if the invention attempts to call out when the extension is already in use, as the invention goes off-hook, listens for a dial tone, does not hear one, and hangs up again; and third, there is no provision for KYZ contact inputs.

In operation, the embodiment shown in FIG. 4 addresses each of these disadvantages. The embodiment shown in FIG. 4 has the ability to operate in precisely the same way as that shown in FIG. 3 and discussed above.

In addition, the embodiment shown in FIG. 4 can be contacted by a caller even if another extension answers first. The microprocessor subsystem 24 of FIG. 4 is programmed to respond to a particular sequence of DTMF tones; the sequence is called the access code, and is selected so that it is unlikely that it will be accidentally dialed. (In practice, incorporating a series of '#' and '*' tones, combined with four or more digits, provides a sufficient access code.) When the microprocessor subsystem 24 detects its access code, it instructs the relay 32 to go to its off-hook state. This behavior allows a caller to access the invention, even if another extension answers first, by simply dialing the access code while connected to the other extension. If, for example, the invention is sharing an extension with a security guard's telephone, a caller might greet the security guard when she answers the phone on the first ring, request permission from the security guard to access the invention, then dial the access code of the invention. The invention goes to its off-hook state, and the caller is now connected to both the security guard and the invention. The caller then ask the security guard to hang up. At this point, the caller is exclusively connected to the invention. Of course, the invention may be programmed to answer the line itself after some large number of rings, so as to deal with those cases where other users of the extension do not answer the phone.

Recalling that the AGC level signal 135 allows the microprocessor subsystem 24 to determine if there is already a call in progress on an extension coupled to conductor pair 33, 34, we can see that the microprocessor subsystem 24 can elect to defer any outgoing calls it needs to make if the extension/conductor pair 33, 34 is already in use. Before going to its off-hook state to make an outgoing call, the microprocessor subsystem waits for a period of steady, low value on the AGC level signal 135, which corresponds to silence or inactivity on the extension/conductor pair 33, 34. Although this approach is imperfect (the invention may go off-hook during an extended silence in an on-going conversation, then immediately go on-hook again when it does not detect a dial tone), it avoids almost all of the activities of the invention that could annoy a user who is sharing the same telephone conductor pair.

In operation, the embodiment shown in FIG. 4 also accumulates pulses from the metering contacts (KYZ) 50, and may multiply the accumulated value by some programmed constant as is well known in the art. This permits the invention to report on kilowatt-hours consumed, peak demand, and similar electric power parameters.

Other Embodiments

It will be apparent to one familiar with the art that other useful embodiments of the invention are possible. Electric power voltage signals and current signals may be sensed at locations other than the utility revenue meter. Electric power voltage signals alone may be sensed, omitting current signals; or electric power current signals alone may be sensed, omitting voltage signals. Various security codes may be required of the caller before a caller is allowed to adjust internal thresholds and parameters. The synthesized voice signal may be transmitted through systems other than the telephone system such as short-distance radio transmission. Various other modifications may be made to the preferred embodiment without departing from the spirit and scope of the invention as defined by the appended claims.

I claim:

1. An apparatus for measuring and reporting a plurality of electric power parameters on an alternating current power system, comprising:

a. a measuring means coupled to said alternating current power system, said measuring means forming a plurality of electric power parameter measurements; and b. a speech synthesis reporting means coupled to said measuring means, said speech synthesis reporting means forming an electric power parameter synthesized speech report from said plurality of electric power parameter measurements.

2. An apparatus for measuring and reporting a plurality of electric power parameters on an alternating current power system, comprising:

a. a measuring means coupled to said alternating current power system, said measuring means forming a plurality of electric power parameter measurements;
   b. a triggering means coupled to said measuring means, said triggering means initiating an electric power parameter report, said electric power parameter report formed from said plurality of electric power parameter measurements; and
   c. a speech synthesis reporting means coupled to said electric power parameter report for generating a synthesized speech report, said speech synthesis reporting means further coupled to a public telephone system.

3. An apparatus for measuring a plurality of electric power parameters on an alternating current power system, comprising:

a. a plurality of scaling and amplifying means coupled to said alternating current power system, said scaling and amplifying means forming a plurality of electric power parameter signals;
   b. a detecting means for detecting at least one of a plurality of types of electric power events, said detecting means coupled to receive said electric power parameter signals, said detecting means forming a triggering output signal;
   c. a triggering means for triggering a power parameter report in response to one of an elapsed time and said triggering output signal, said triggering means coupled to said detecting means;
   d. a reporting means for forming said power parameter report, said reporting means coupled both to said triggering means and to receive said electric power parameter signals;
   e. a voice synthesis means for forming a spoken form of said power parameter report, said voice synthesis means coupled to said reporting means; and
   f. a coupling means for coupling said spoken form of said power parameter report to a speech transmission means, said coupling means coupled to said voice synthesis means.

4. The apparatus of claim 3, wherein the speech transmission means utilizes a telephone system.

5. The apparatus of claim 4, wherein the apparatus is configured to share a line of the telephone system with another user.

6. The apparatus of claim 3 wherein the reporting means comprises a microprocessor subsystem.

7. An apparatus for measuring a plurality of electric power parameters on an alternating current power system, configured to allow predetermined functions to be controlled through a telephone system, comprising:

a. a plurality of scaling and amplifying means coupled to said alternating current power system, said scaling and amplifying means forming a plurality of electric power parameter signals;
   b. a first detecting means for detecting a plurality of types of electric power events, said first detecting means coupled to said electric power parameter signals, said first detecting means having a plurality of power parameter thresholds, said first detecting means forming a triggering output;
   c. a triggering means for triggering a power parameter report, said triggering means capable of sensing one of an elapsed time and said triggering output from said first detecting means, said triggering means coupled to said first detecting means, said triggering means having a plurality of elapsed time parameters;
   d. a reporting means for forming a power parameter report, said reporting means coupled both to said triggering means and to said electric power parameter signals;
   e. a second detecting means for detecting one of a plurality of dual tone multifrequency signals, said second detecting means coupled to said telephone system;
   f. a programming means for programming said power parameter thresholds and said elapsed time parameters, said programming means coupled to said second detecting means, said programming means further incorporating a menu of programming choices, said second detecting means capable of selecting within said menu of programming choices in response to said dual tone multifrequency signals detected by said second detecting means;
   g. a voice synthesis means for forming a spoken form of said power parameter report and for forming a spoken form of said menu of programming choices, said voice synthesis means coupled to said reporting means and said programming means; and
   h. a coupling means for coupling said spoken form of said power parameter report and said spoken form of said menu of programming choices to said telephone system, said coupling means coupled to said voice synthesis means.

8. An apparatus for measuring a plurality of electric power parameters on an alternating current power system, configured to employ a shared telephone conductor pair, further comprising:

a. a plurality of scaling and amplifying means coupled to said alternating current power system, said scaling and amplifying means forming a plurality of electric power parameter signals;
   b. a first detecting means for detecting a plurality of types of electric power events, said first detecting means coupled to said electric power parameter signals, said first detecting means forming a triggering output;
   c. a triggering means for triggering a power parameter report, said triggering means capable of sensing one of an elapsed time and said triggering output, said triggering means coupled to said first detecting means;
   d. a reporting means for forming said power parameter report, said reporting means coupled both to said triggering means and to said electric power parameter signals;
   e. a voice synthesis means for forming a spoken form of said power parameter report, said voice synthesis means coupled to said reporting means;
   f. a coupling means for coupling said spoken form of the power parameter report to said shared telephone conductor pair, said coupling means coupled to receive said spoken form of said power parameter report, said coupling means capable of being activated;

g. a second detecting means configured for forming a telephone conductor pair in-use signal, said second detecting means coupled to said shared telephone conductor pair both when said apparatus is in its on-hook state and when said apparatus is in its off-hook state; and h. a decision means for deferring the activation of the coupling means, said decision means coupled to said shared telephone conductor pair in-use signal.

9. An apparatus for measuring a plurality of electric power parameters on an alternating current power system, capable of employing a shared telephone conductor pair which is capable of being shared with another user, further comprising:

a. a plurality of scaling and amplifying means coupled to said alternating current power system, said scaling and amplifying means forming a plurality of electric power parameter signals;

b. a first detecting means for detecting a plurality of types of electric power events, said first detecting means coupled to said electric power parameter signals, said first detecting means forming a triggering output;

c. a triggering means for triggering a power parameter report, said triggering means capable of sensing either an elapsed time or said triggering output, said triggering means coupled to the first detecting means;

d. a reporting means for forming said power parameter report, said reporting means coupled both to said triggering means and to said electric power parameter signals;

e. a voice synthesis means for forming a spoken form of said power parameter report, said voice synthesis means coupled to said reporting means;

f. a coupling means for coupling said spoken form of the power parameter report to said shared telephone conductor pair, said coupling means coupled to receive said spoken form of said power parameter report;

g. a second detecting means configured for detecting dual tone multifrequency signals, said second detecting means coupled to said shared telephone conductor pair both when said apparatus is in its on-hook state and when said apparatus is in its off-hook state; and h. a decision means for deciding to activate said coupling means, said decision means coupled to said second detecting means.

* * * * *